(12) United States Patent
Wu et al.

(10) Patent No.: US 9,754,069 B2
(45) Date of Patent: Sep. 5, 2017

(54) DETERMINING SLACK ESTIMATES FOR MULTIPLE INSTANCES OF A CELL IN A HIERARCHICAL CIRCUIT DESIGN

(71) Applicant: Synopsys, Inc., Mountain View, CA (US)

(72) Inventors: Qiuyang Wu, Portland, OR (US); Chang Zhao, Portland, OR (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 14/885,920

(22) Filed: Oct. 16, 2015

(65) Prior Publication Data

US 2017/0109468 A1    Apr. 20, 2017

(51) Int. Cl.
*G06F 17/50* (2006.01)

(52) U.S. Cl.
CPC ................... *G06F 17/5081* (2013.01)

(58) Field of Classification Search
CPC ....... H01L 27/0207; H01L 2224/73253; H01L 2924/13091; H01L 21/8221; H01L 27/0688; H01L 27/10876; G06F 17/5081; G06F 17/5068; G06F 17/5063; G06F 2217/78; G06F 17/5031; G06F 17/5022; G06F 17/5072; G06F 17/5054; G06F 17/5077; G06F 17/5009; G06F 17/504; G06F 17/5045

USPC .................................. 716/100–106, 136–139
See application file for complete search history.

(56) References Cited

U.S. PATENT DOCUMENTS

| 6,058,252 | A | * | 5/2000 | Noll | .................... | G06F 17/5068 716/113 |
| 7,689,942 | B2 | * | 3/2010 | Acar | .................... | G06F 17/5031 716/134 |
| 8,434,040 | B2 | | 4/2013 | Bhardwaj et al. | | |
| 8,813,011 | B2 | | 8/2014 | Bhardwaj et al. | | |
| 2005/0268258 | A1 | * | 12/2005 | Decker | ............... | G06F 17/5081 716/104 |
| 2011/0307850 | A1 | | 12/2011 | Dartu et al. | | |

* cited by examiner

*Primary Examiner* — Binh Tat
(74) *Attorney, Agent, or Firm* — Fenwick & West LLP (57) ABSTRACT

Embodiments perform static timing analysis using a digital representation of a circuit. The digital representation of the circuit includes multiple instances of a cell in a hierarchical cell block circuit. Timing context information is determined for each instance of the cell included in the circuit. A merged timing context information is determined to bound and cover each of the plurality of instances of the cell. A slack estimate is determined for a pair of ports for each instance of the cell. The instance with the smallest slack estimate is identified. A slack estimate for a pair of ports of the cell is determined based on the merged timing information of the cell. A timing credit is determined for the pair of ports based on the slack of the instance with the smallest slack and the slack estimate from the bound information for the pair of ports.

21 Claims, 8 Drawing Sheets

DETERMINING SLACK ESTIMATES FOR MULTIPLE INSTANCES OF A CELL IN A HIERARCHICAL CIRCUIT DESIGN

BACKGROUND

1. Field of Art

The disclosure generally relates to the field of static timing analysis in circuit design and more specifically to reducing timing pessimism for multiple instances of a physical block in a hierarchical circuit design.

2. Description of the Related Art

Integrated circuit designs are simulated to assess their performance and determine whether the design works as expected. For instance a circuit design may be simulated to determine the behavior of the circuit design in response to certain input signals. Circuit designs may also be analyzed to determine whether the different stages of the circuit meet certain timing requirements. For instance, a circuit design is analyzed to determine whether the total propagation delays of all the timing paths or a specific timing path is within the setup time and the hold time of the flip-flop(s) connected at the end of the timing path(s).

Oftentimes, multiple instances of a same cell or circuit block are used (or reused) inside a larger integrated circuit. For instance, multiple copies of the same adder (or microprocessor, or digital-signal-processor, or memory, etc.) blocks may be used inside the design of a processor. Such reused cell block is often referred as multi-instance module or MIM blocks. However if timing analysis is to be performed only once for the cell and used for each instance, the timing analysis often has to be very pessimistic. This is so because the analysis of the cell often does not have the full knowledge of the all the instantiations at higher level and therefore must assume tighter timing constraints (and budgets) than the worst case timing constraints of each individual instance of the cell used in the integrated circuit. As a result, the circuit design is likely to be sub-optimal in terms of important design metrics such as power, performance, and areas. Alternatively, the timing analysis may be performed by enumeration of each instance of the cell to achieve better accuracy. However, the enumeration analysis may be very slow and computation intensive because each instance is analyzed separately for every possible scenarios. Accordingly, conventional techniques either provide efficient analysis but highly conservative results or accurate results but very inefficient analysis.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Embodiments of a disclosed system, method, and computer readable storage medium perform static timing analysis. A digital representation of a circuit is received. The digital representation of the circuit includes multiple instances of a cell. A cell has multiple ports (or pins) for connection with outside circuit (hereinafter referred to as the parent level circuit) and for signals to enter into or exit from the cell. Some of these multiple ports carry clock signals from parent level, while other ports receive data signals from parent level or sends out signals to parent level.

Timing context information (for example, data arrival time, or clock latency) is received at the above mentioned boundary ports (pins) for each of the instances of the cell included in the parent level circuit. The timing context information is captured for both data and clock signals. A merged timing context information, hereinafter referred to as merged timing context or bounding context, is determined by considering the worst case bounding across the timing context information from all instances at any given boundary port, for both data and clock path signals. In timing analysis, the data signals are measured against clock signals at each path end storage devices (e.g. flip-flops, registers, etc.) to compute a slack. Application of the merged timing context information at the ports provides the worst case timing analysis (such as stage delays and path arrivals) of the cell. There are multiple timing paths crossing the cell boundary and measured against multiple different clock signals crossing the same cell boundary, applying the same merged timing context for all combinations introduces significant pessimism into the timing analysis at cell level, because often not all combinations happen at the same instance of the cell.

For each given specific timing context crossing the cell boundary measured against another timing context crossing the cell boundary at a different port, a representative slack estimation (hereafter referred to as the pseudo-slack) is determined for each instance of the cell, and the instance with the smallest pseudo-slack for the specific path is identified. The difference between this smallest instance specific pseudo-slack and the pseudo-slack based on the merged bounding timing context information is determined for each port (and port combinations) of the multiple instances of the cell. A timing credit is determined from these computed pseudo-slack differences and applied to the timing analysis of the cell to remove the pessimism.

Computing Machine Architecture

Figure 1:
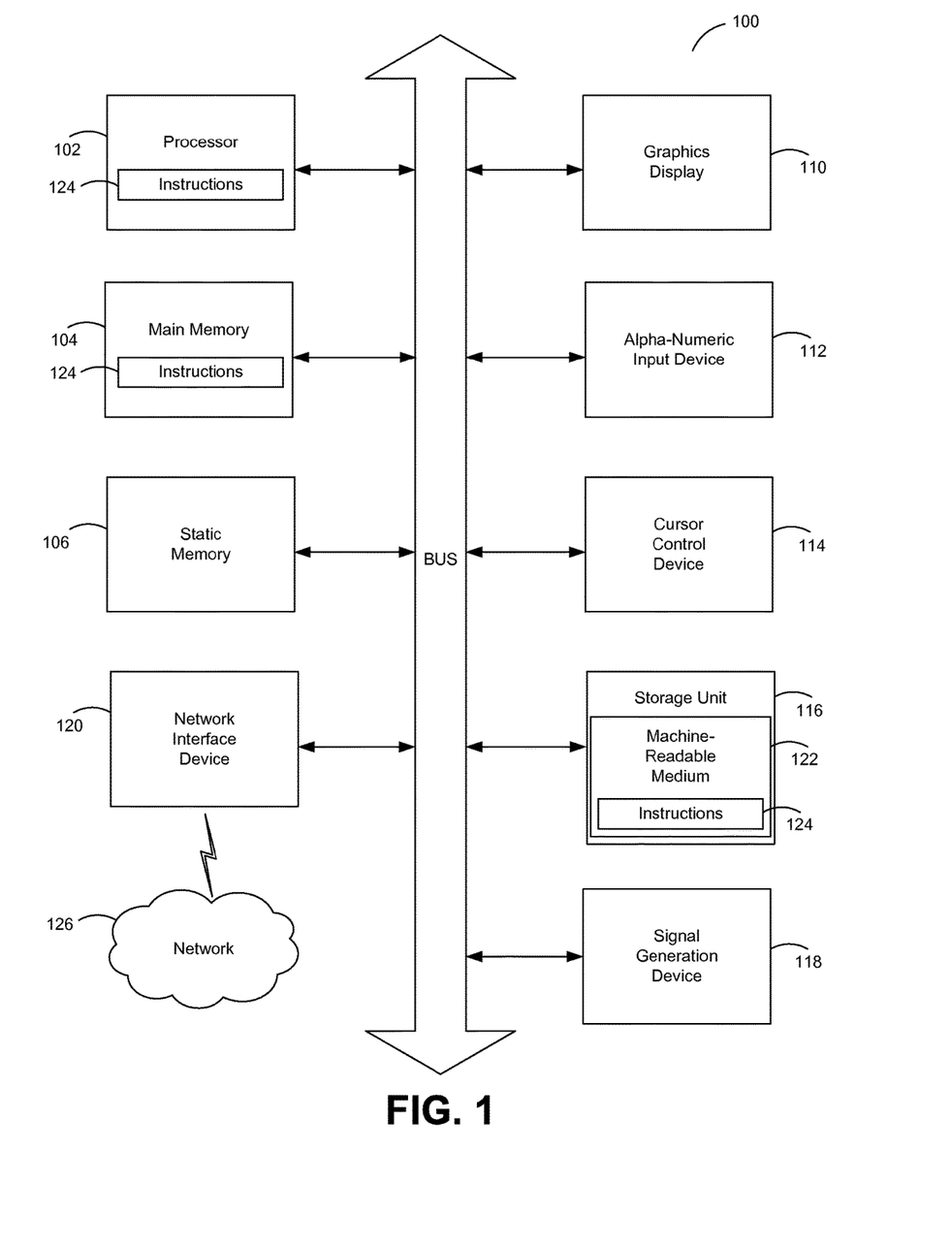
FIG. 1 illustrates one embodiment of components of an example machine able to read instructions from a machine-readable medium and execute them in a processor (or controller).

FIG. 1 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 820, which also are configured to communicate via the bus 108.

The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Overview of EDA Design Flow

Figure 2:
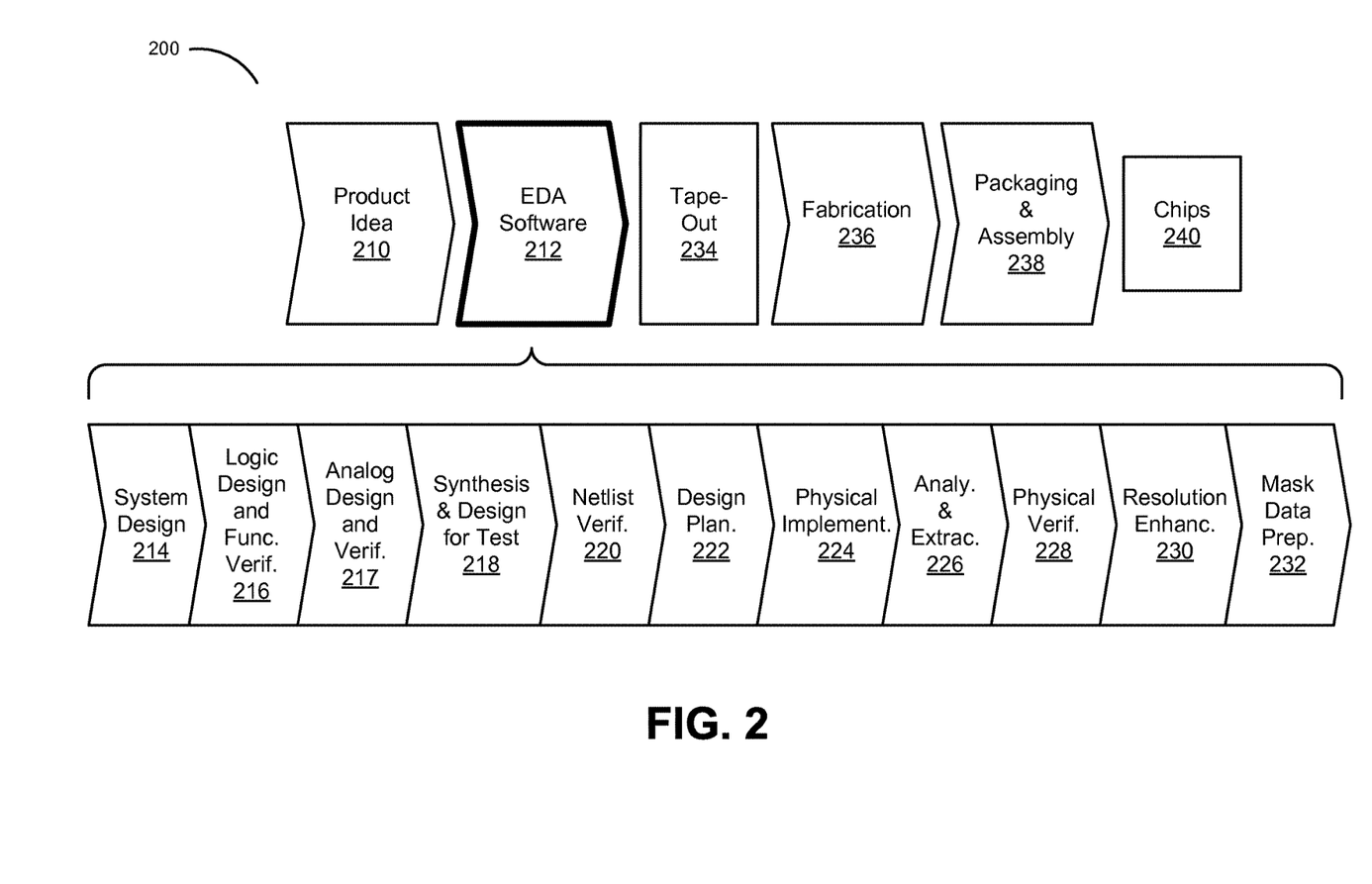
FIG. 2 illustrates a flowchart illustrating various operations in the design and fabrication of an integrated circuit, according to one embodiment.

FIG. 2 is a flowchart 200 illustrating the various operations in the design and fabrication of an integrated circuit. This process starts with the generation of a product idea 210, which is realized during a design process that uses electronic design automation (EDA) software 212. When the design is finalized, it can be taped-out 234. After tape-out, a semiconductor die is fabricated 236 to form the various objects (e.g., gates, metal layers, vias) in the integrated circuit design. Packaging and assembly processes 238 are performed, which result in finished chips 240.

The EDA software 212 may be implemented in one or more computing devices such as the computer 100 of FIG. 1. For example, the EDA software 212 is stored as instructions in the computer-readable medium which are executed by a processor for performing operations 214-232 of the design flow, which are described below. This design flow description is for illustration purposes. In particular, this description is not meant to limit the present disclosure. For example, an actual integrated circuit design may require a designer to perform the design operations in a difference sequence than the sequence described herein.

During system design 214, designers describe the functionality to implement. They can also perform what-if planning to refine the functionality and to check costs. Note that hardware-software architecture partitioning can occur at this stage. Example EDA software products from Synopsys, Inc. of Mountain View, Calif. that can be used at this stage include: Model Architect®, Saber®, System Studio®, and Designware® products.

During logic design and functional verification 216, VHDL or Verilog code for modules in the circuit is written and the design is checked for functional accuracy. More specifically, the design is checked to ensure that it produces the correct outputs. Example EDA software products from Synopsys, Inc. of Mountain View, Calif. that can be used at this stage include: VCS®, Vera®, 10 Designware®, Magellan®, Formality®, ESP® and Leda® products.

During analog design, layout, and simulation 217, analog circuits are designed, layed out, and simulated to ensure both functionality and performance. Example EDA software products from Synopsys, Inc. of Mountain View, Calif. that can be used at this stage include: Custom Designer®, Hspice®, HspiceRF®, XA®, Nanosim®, HSim®, and Finesim® products.

During synthesis and design for test 218, VHDL/Verilog is translated to a netlist. This netlist can be optimized for the target technology. Additionally, tests can be designed and implemented to check the finished chips. Example EDA software products from Synopsys, Inc. of Mountain View, Calif. that can be used at this stage include: Design Compiler®, Physical Compiler®, Test Compiler®, Power Compiler®, FPGA Compiler®, Tetramax®, and Designware® products.

During netlist verification 220, the netlist is checked for compliance with timing constraints and for correspondence with the VHDL/Verilog source code. Example EDA software products from Synopsys, Inc. of Mountain View, Calif. that can be used at this stage include: Formality®, PrimeTime®, and VCS® products.

During design planning 222, an overall floor plan for the chip is constructed and analyzed for timing and top-level routing. Example EDA software products from Synopsys, Inc. of Mountain View, Calif. that can be used at this stage include: Astro® and IC Compiler® products.

During physical implementation 224, the placement (positioning of circuit elements) and routing (connection of the same) occurs. Example EDA software products from Synopsys, Inc. of Mountain View, Calif. that can be used at this stage include: the Astro® and IC Compiler® products.

During analysis and extraction 226, the circuit function is verified at a transistor level, which permits refinement. Example EDA software products from Synopsys, Inc. of Mountain View, Calif. that can be used at this stage include: Astrorail®, Primerail®, PrimeTime®, and Star RC/XT® products.

During physical verification 228, the design is checked to ensure correctness for: manufacturing, electrical issues, lithographic issues, and circuitry. Example EDA software products from Synopsys, Inc. of Mountain View, Calif. that can be used at this stage include the Hercules® product.

During resolution enhancement 230, geometric manipulations of the layout are performed to improve manufacturability of the design. Example EDA software products from Synopsys, Inc. of Mountain View, Calif. that can be used at this stage include: Proteus®, Proteus® AF, and PSMGED® products.

During mask-data preparation 232, the 'tape-out' data for production of masks to produce finished chips is provided. Example EDA software products from Synopsys, Inc. of Mountain View, Calif. that can be used at this stage include the CATS® family of products.

Embodiments of the present disclosure can be used during one or more of the above-described stages. Specifically, embodiments may be used for the processes of design planning 222 and physical implementation 224.

Static Timing Analysis

A static timing analysis tool or static timing analyzer computes timing information for a circuit design. By using a static timing analyzer, a designer can determine whether the circuit design contains any timing violations, such as a hold time violation or a setup time violation. Static timing analyzers determine a timing slack for the various timing paths of the circuit design. As used herein, timing slack is the difference between the target delay time of a path and the delay time of the path as determined by the static timing analyzer. A positive value for the slack indicates that the circuit design does not have a timing violation, and a negative value for the slack indicates that the circuit design has a timing violation.

Figure 3:
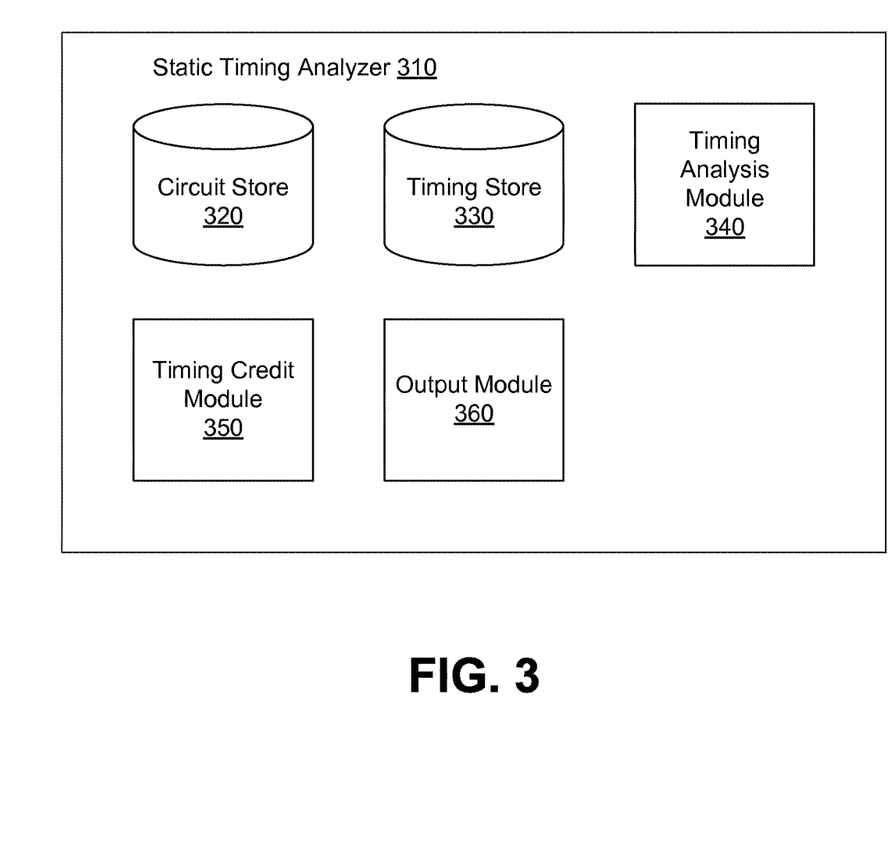
FIG. 3 illustrates a system architecture diagram showing various modules of a static timing analyzer, according to one embodiment.

FIG. 3 is a system architecture diagram showing various modules of a static timing analyzer, according to one embodiment. The static timing analyzer 310 comprises modules including a circuit store 320, a timing store 330, a timing analysis module 340, a timing credit module 350, and an output module 360. In other embodiments, the static timing analysis system 310 may include additional, fewer, or different modules for various applications. Conventional components such as network interfaces, security mechanisms, load balancers, failover servers, management and network operations consoles, and the like are not shown so as to not obscure the details of the system.

The circuit store 320 stores a description of the circuit being analyzed including a netlist, various constraints, and so on. In an embodiment, the circuit store 320 may represent the circuit using a graph representation in which the nodes correspond to various components of the circuit and the edges correspond to the connections between the circuits. The output module 360 sends information describing the timing violations, the priorities of timing violations, and reasons associated with timing violations for presentation to a user.

To increase the speed of static timing analysis, static timing analyzer 310 uses a set of predetermined timing responses stored in the timing store 330. The timing store 330 stores a pre-computed timing response for cells used in an integrated circuit for various input waveforms.

The static timing analyzer 310 identifies input waveforms used to pre-compute the timing response of cells by a transition time. As used herein, a transition time is the amount of time that takes a waveform to transition from a lower transition trip-point, for example, 30% of the supply voltage level (0.3 VDD), to an upper transition trip-point, for example, 70% of the supply voltage level (0.7 VDD), or the amount of time that takes a waveform to transition from an upper transition trip-point, for example, 70% of the supply voltage level (0.7 VDD) to a lower transition trip-point, for example, 30% of the supply voltage level (0.3 VDD). The lower and upper transition trip-points may have other values as long as the value of the upper transition trip-point is greater than the value of the lower transition trip-point.

Given an input waveform, the timing analysis module 340 determines the delay of a cell by querying or looking up timing store 330 with information identifying the input waveform. The timing analysis module 340 receives a delay value from the timing store 330 based on the information identifying the input waveform. For instance, the timing analysis module 340 receives a delay value from the timing store 330 based on the transition time of the input waveform.

Figure 4:
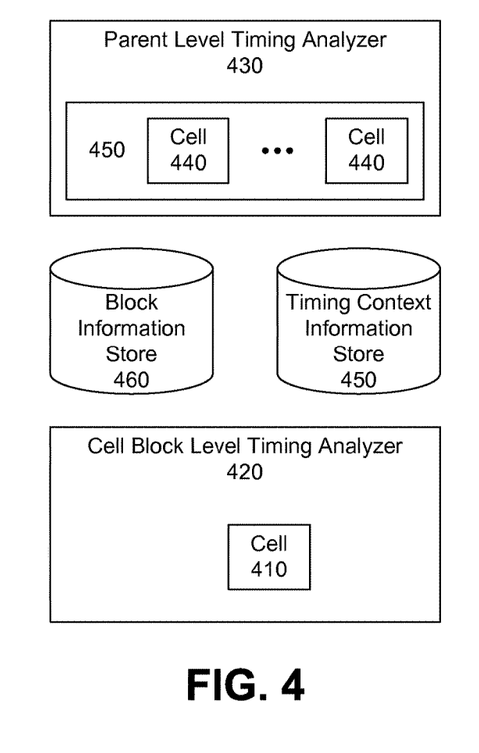
FIG. 4 illustrates a typical flow for performing hierarchical static timing analysis, according to one embodiment.

FIG. 4 illustrates a typical system to perform hierarchical timing analysis in order to improve the efficiency of the analysis tool including performance and capacity. In this flow, a cell block circuit 410 is analyzed by a cell block level timing analyzer 420 separately from the analysis of the parent level circuit performed by the parent level timing analyzer 430. Parent level circuit 450 may include multiple instances of the same cell block 440. The parent level analyzer 430 may generate timing context information, which is stored in timing context information store 450, as additional input to block level timing analysis. The block level timing analysis may make use of the context information in order to achieve a more accurate analysis. The parent level analyzer 430 may use the entire cell block circuit. Optionally, block level analyzer 430 may generate a more compact and reduced representation of the block, which is stored in block information store 460, to help improve the overall turnaround time and timing convergence of the entire design. A reduced representation may be represented in the form of either a compact timing model or reduced block circuit. The disclosed embodiments are applicable to hierarchical analysis flows with either full or reduced cell circuit as the block representation.

The timing credit module 350 determines a timing credit to be added to the slack of a merged context timing slack. The timing credit removes pessimism added to the mixed mode timing slack. The timing credit module 350 may determine timing credits for each data input port-clock input port pair and for each clock input port-clock input port pair. In some embodiments, the timing credit module 350 may additionally determine timing credits for data output port-clock input port pairs. The timing credit module 350 stores the timing credit in association with the port pairs in a data structure, for example, a table mapping pairs of ports of the cell with the timing credit values. During the design and/or optimization of the circuit, the timing credits may be accessed from the table structure and applied to the estimates of slacks of the merged context to ease the timing constraint associated with the slacks.

FIG. 4 illustrates an exemplary circuit diagram for performing a static timing analysis. The circuit diagram of FIG. 4A includes two instances I1 and I2 of a specific cell M0. The first instance I1 of the specific cell has an input that arrives in the timing window between times $D1_i$ and $D1_f$ (data timing window), and a clock that arrives in the timing window between $C1_i$ and $C1_f$ (clock timing window). The second instance I2 of the specific cell has an input that arrives in the timing window between times $D2_i$ and $D2_f$ (data timing window), and a clock that arrives in the timing window between $C2_i$ and $C2_f$ (clock timing window). In the exemplary circuit of FIG. 4, instance I1 has a register R1 and instance I2 has a register R2. Since both instances I1 and I2 are instances of cell M0, both registers R1 and R2 have the same timing constraints. For instance, both registers R1 and R2 have the same hold time and the same setup time. As such, cell M0 has to be designed to function properly with the corners of both instances I1 and I2.

Figure 5:
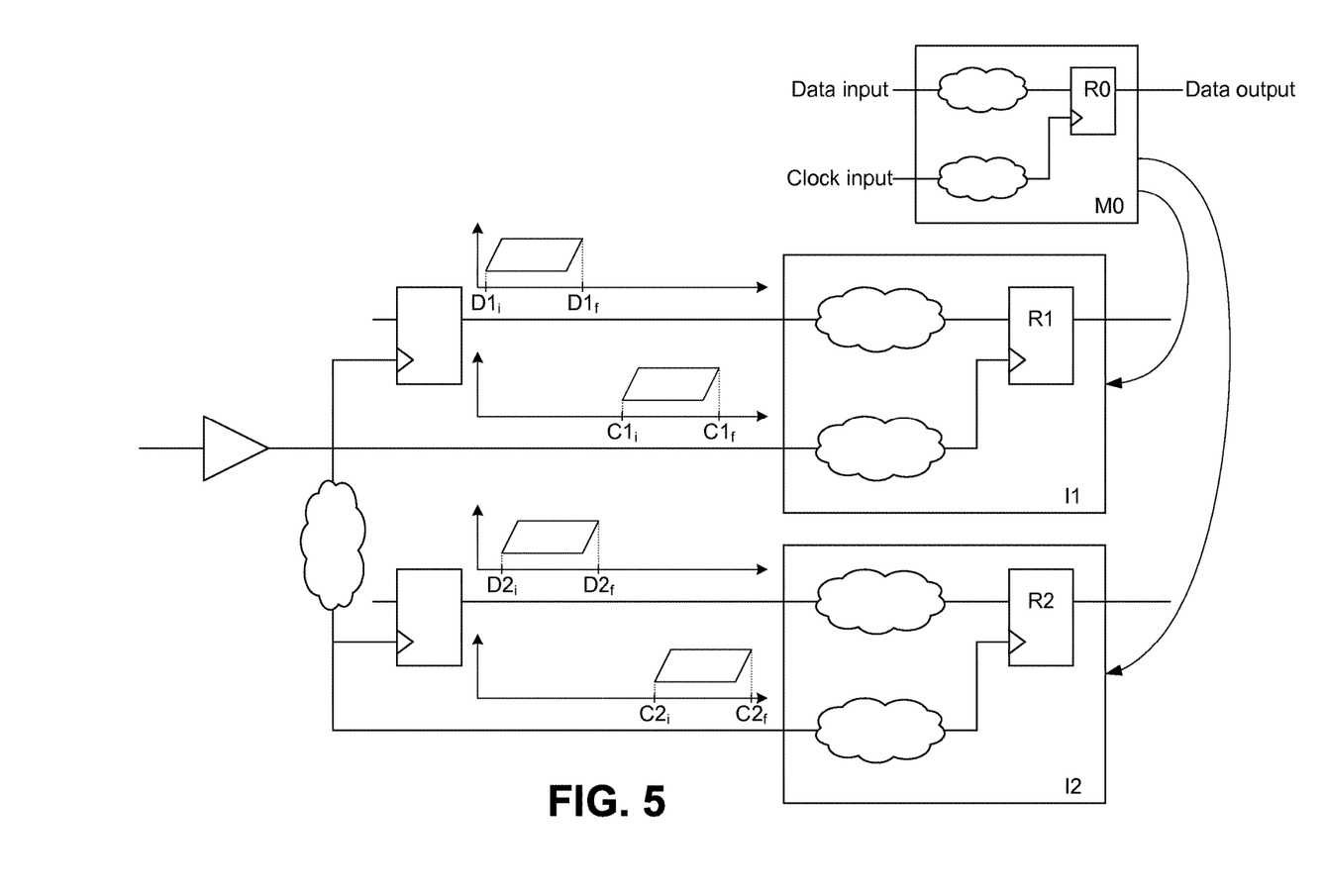
FIG. 5 illustrates an exemplary circuit diagram for performing a static timing analysis, according to one embodiment.
Figure 6:
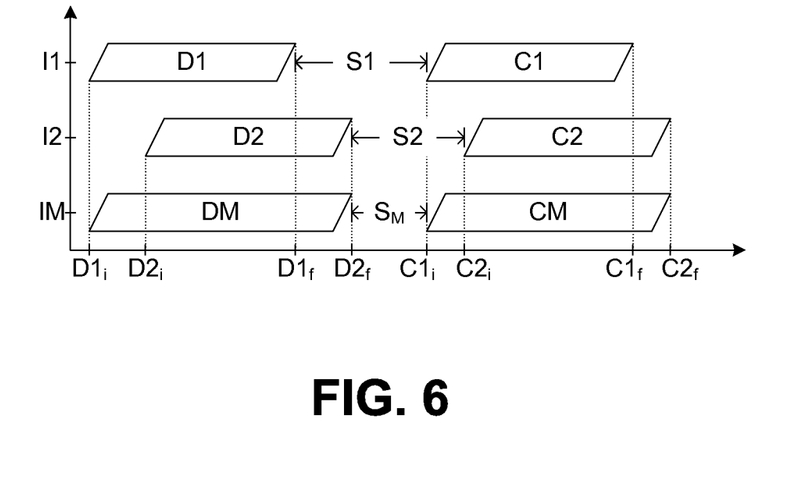
FIG. 6 illustrates a timing diagram for the circuit of FIG. 4, according to one embodiment.

FIG. 5 illustrates an exemplary timing diagram of I1 and I2 of FIG. 4, according to one embodiment. In the timing diagram of FIG. 5, the data of instance I1 may arrive, at the latest, at time $D1_f$, and the clock of instance I1 may arrive, at the earliest, at time $C1_i$. Thus, instance I1 has a slack of:

$$S1 = C1_i - D1_f$$

Similarly, the data of instance I2 may arrive, at the latest, at time $D2_f$, and the clock of instance I2 may arrive, at the earliest, at time $C2_i$. Thus, instance I2 has a slack of:

$$S2 = C2_i - D2_f$$

Since each instance I1 and I2 are copies of cell M0, M0 should satisfy the timing requirements of each instance. As such, to design and optimize cell M0, a merged context $I_M$ may be used. The merged context is a representation of the worst case timing requirements based on timing of every individual instance (for example, I1 and I2) of cell M0. In an embodiment, the merged context may be represented as a merged instance of the cell. As illustrated in FIG. 5, the data for the merged context $I_M$ arrives in the time window between times $D1_i$ and $D2_f$, and the clock of the merged context $I_M$ arrives in the time window between times $C1_i$ and $C2_f$. Thus, merged context $I_M$ has a slack of:

$$S_M = C1_i - D2_f$$

In the example of FIG. 5, it can be noticed that the slack $S_M$ of the merged context $I_M$ is smaller than both instances I1 and I2 of cell M0. This is because in the worst case scenario, the merged context $I_M$ would consider a data signal provided to instance I2 with a clock signal provided to instance I1. This scenario would not happen in the actual circuit and thus, designing and/or optimizing cell M0 for the merged context $I_M$ may cause an overly pessimistic of cell M0. This may result in difficulties in achieving a timing closure for cell M0.

In order to account for the unrealistic timing constraints of the merged context, a timing credit is determined by the timing credit module 350 and applied to the merged context $I_M$ during the design/analysis and/or optimization of cell M0. In some embodiments, a timing credit is determined for each data-clock pair and each clock-clock pair of cell M0. That is, if cell M0 has N data input/output ports and M clock input ports, the number of timing credits determined by the timing credit module 350 is approximately equal to:

$$N \times M + M^2$$

Figure 7:
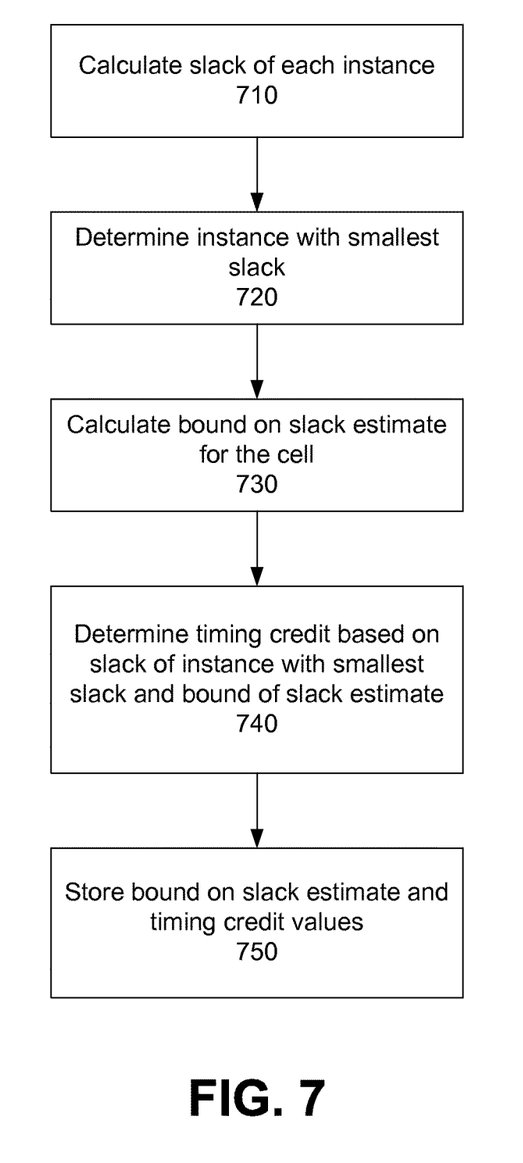
FIG. 7 is a flow chart illustrating a process for determining timing credit values and bounds on slack estimates for a cell used in a circuit, according to one embodiment.

FIG. 7 illustrates a flow diagram of a process for determining the timing credit, according to one embodiment. The timing credit module 350 calculates 710, a slack for each of the instances of a cell. The timing credit module 350 calculates 710 the slack $S_i$ of instance i of the cell as:

$$S_i = \text{clock\_latency}(i) - \text{data\_arrival}(i)$$

Where clock_latency(i) is the earliest a clock signal is expected to arrive to a clock input port of instance i, and data_arrival(i) is the latest a data signal is expected to arrive to a data input port of instance i.

The timing analysis module 340 determines 720 the instance with the smallest slack. For instance, in the example of FIGS. 4 and 5, if the data of instance I1 arrives within the time window between 1 ns and 2 ns and the clock of instance I1 arrives within the time window between 10 ns and 11 ns, and the data of instance I2 arrives within the time window between 1.5 ns and 3 ns and the clock of instance I2 arrives within the time window between 10.5 ns and 12 ns, the respective slacks can be determined as:

$$S_1 = 10 - 2 = 8$$

$$S_2 = 10.5 - 3 = 7.5$$

As such, instance I2 has the smallest slack of 7.5 ns.

The timing analysis module 340 determines 730 a bound on the slack estimate for a pair of ports as follows. The timing analysis module 340 determines 730 a slack estimate for the pair of ports corresponding to the merged context $I_M$. The slack $S_M$ of the merged context $I_M$ is calculated as:

$$S_M = \min(\text{clock\_latency}(i)) - \max(\text{data\_arrival}(i))$$

Where min(clock_latency(i)) is the smallest clock latency among every instance of the cell being analyzed. That is, the earliest a clock signal is expected to arrive to a clock input port of any instance of the cell. The value of max(data_arrival(i)) is the largest data arrival delay among every instance of the cell being analyzed. That is, the latest a data signal is expected to arrive to a data input port of any instance of the cell.

The timing credit module 350 determines 740 a timing credit value based on the slack of the instance with the smallest slack and the slack of the merged context $I_M$. As such, the timing credit module 350 calculates the time credit as:

$$\text{time\_credit} = \min(S_i) - S_M$$

The above equation may be expanded as follows:

$$\text{time\_credit} = \min(\text{clock\_latency}(i) - \text{data\_arrival}(i)) - [\min(\text{clock\_latency}(i)) - \max(\text{data\_arrival}(i))]$$

In some embodiments, if clock path reconvergence pessimism (CRP) is taken into account, the timing credit module 350 calculates the time credit value as:

$$\text{time\_credit} = \min(\text{clock\_latency}(i) - \text{data\_arrival}(i) + \text{CRP}(i)) - [\min(\text{clock\_latency}(i)) - \max(\text{data\_arrival}(i)) + \min(\text{CRP}(i))]$$

where CRP(i) is the clock reconvergence pessimism removal correction value for instance i of the cell, and min(CRP(i)) is the smallest CRP among all the instances of the cell. As used herein, clock reconvergence pessimism or CRP is understood as the amount of pessimism introduced to a path timing slack due to a common (or shared) path between a launch clock path and a capture clock path considered by static timing analysis.

In some embodiments, the timing credit module stores 750 the timing credit values in a table structure. For example, the table structure may store an association between each pair of ports of the cell and the timing credit value for the pair of ports. During the design and/or optimization of the cell, the timing credits stored in the table structure are retrieved and the slack estimates for pairs of the ports of the cell are determined by adjusting the bounds on slack estimates based on the retrieved timing credits.

In some embodiments, the timing credits computed may further consider details such as timing exceptions and other mechanisms which result in further differentiations of timing paths across multiple instances. This consideration allows an even more fine-grained and accurate path slack compensation.

Figure 8:
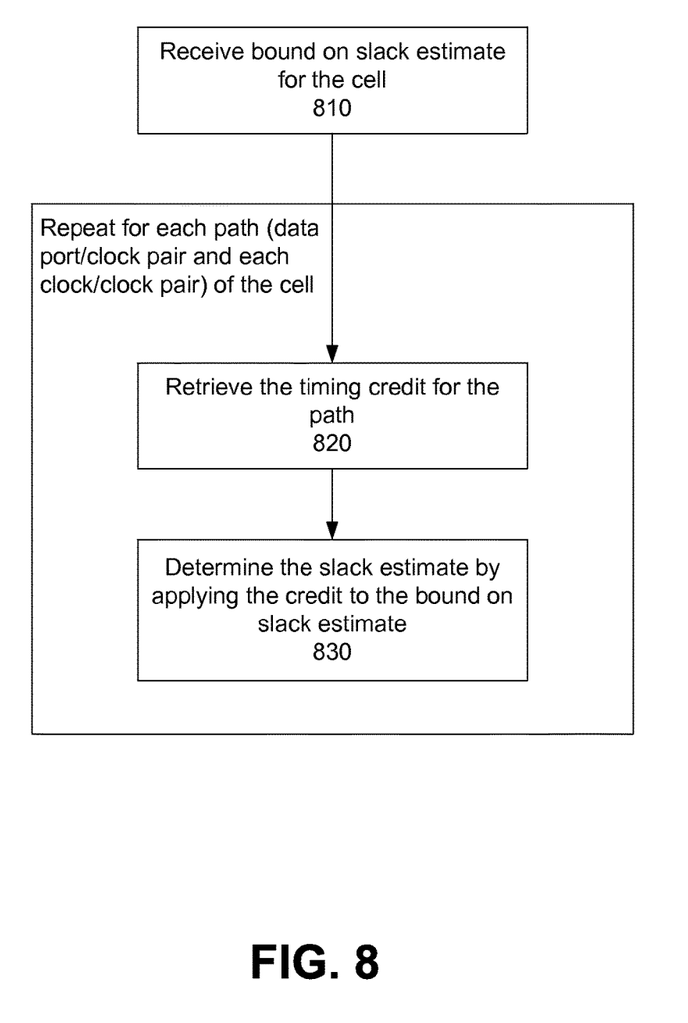
FIG. 8 is a flow chart illustrating a process for determining slack estimates for paths of a cell, according to one embodiment.

FIG. 8 is a flow chart illustrating a process for determining slack estimates for paths of a cell, according to one embodiment. The timing analysis module 340 receives 810 the bound on slack estimates determined using the process of FIG. 7. The timing analysis module 340 repeats the following steps for each path of the cell. A path of the cell corresponds to pairs of data ports and clock ports or pairs of clock ports and clock ports.

For each path of the cell, the timing analysis module 340 retrieves 820 the timing credit value determined for the path. The timing analysis module 340 determines 830 the slack estimate for the path by applying the timing credit value to the bound on slack estimates. The timing analysis module 340 may provide the determined 830 slack estimate to another module performing design or analysis of the circuit.

The processes illustrated in FIGS. 7 and 8 are enumerated for each type of path combinations of the cell block circuit. The slack estimate values are used during various stages of circuit design, for example, during the signoff process or during engineering change orders. The final design generated by the design process incorporating the processes of FIGS. 7 and 8 is sent for fabrication of the circuit (i.e., manufacturing of the circuit).

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for performing static timing analysis comprising:
   receiving digital representation of a circuit, the digital representation of the circuit including a plurality of instances of a cell, the cell having a plurality of ports, the digital representation of the circuit for subsequent design and manufacturing of a circuit;
   receiving timing context information for each of the plurality of instances of the cell;
   determining a slack estimate for pair of ports for each of the plurality of instances of the cell;
   identifying an instance of the plurality of instances of the cell with a smallest slack estimate;
   determining a bound on the slack estimate for a pair of ports of the cell based on the timing context information for each of the plurality of instances of the cell;
   determining, by a computer, a timing credit for the pair of ports of the cell based on the slack of the instance with the smallest slack and the bound on the slack estimate for the pair of ports;
   determining, by the computer, a slack estimate for the pair of ports of the cell by adjusting the bound on the slack estimate for the pair based on the timing credit for the pair; and
   performing static timing analysis of the circuit based on the determined slack estimate.

2. The method of claim 1, wherein the pair of ports of the cell comprises a data input port and a clock input port, and wherein the timing context information of each instance includes:
   a data timing window for input data arrival for the data input port, and
   a clock timing window for clock arrival for the clock input port.

3. The method of claim 2, wherein determining a slack for an instance of the cell comprises:
   determining an end of the data timing window for input data arrival of the data input port;
   determining a start of the clock timing window for clock arrival of the clock input port; and
   determining the slack estimate based on the determined start of the clock timing window for clock arrival and the end of the data timing window for input data arrival.

4. The method of claim 2, wherein determining a bound on the slack estimate for the port pair comprises:
   determine a merged data timing window for the data input port, the merged data timing window based on the data timing window for the data input port for each of the instances of the cell; and
   determining a merged clock timing window for the clock input port, the merged clock timing window based on the clock timing window for the clock input port for each of the instance of the cell.

5. The method of claim 4, wherein:
   the merged data timing window for the data input port includes every data timing window for the data input port of each of the instances of the cell; and
   the merged clock timing window for the clock input port includes every clock timing window for the clock input port of each of the instances of the cell.

6. The method of claim 2, further comprising:
   storing an association between the credit, the data input port, and the clock input port.

7. The method of claim 1, wherein the pair of ports of the cell comprises a first clock input port and a second clock input port, wherein the timing context information of each instance includes:
   a first clock timing window for clock arrival for the first clock input port, and
   a second clock timing window for clock arrival for the second clock input port; and wherein determining a slack for an instance of the cell comprises:
   determining an end of the first clock timing window for clock arrival of the first clock input port,
   determining a start of the second clock timing window for clock arrival of the second clock input port, and
   determining the slack based on the determined start of the second clock timing window and the determined end of the first clock timing window.

8. The method of claim 1, wherein determining the credit for the cell comprises:
   determining a difference between the slack estimate for the pair of ports for the instance with the smallest slack and the bound on slack estimates for the pair of ports of the cell.

9. The method of claim 8, further comprising:
   storing an association between the timing credit value, the first clock input port, and the second clock input port.

10. The method of claim 1, wherein the digital representation of the circuit is for manufacturing the circuit.

11. A non-transitory computer readable storage medium storing instructions, the instruction when executed by a processor cause the processor to:
   receive digital representation of a circuit, the digital representation of the circuit including a plurality of instances of a cell, the cell having a plurality of ports;
   receive timing context information for each of the plurality of instances of the cell, the digital representation of the circuit for subsequent design and manufacturing of a circuit;
   determine a slack estimate for pair of ports for each of the plurality of instances of the cell;
   identify an instance of the plurality of instances of the cell with a smallest slack estimate;
   determine a bound on the slack estimate for a pair of ports of the cell based on the timing context information for each of the plurality of instances of the cell;
   determine a timing credit for the pair of ports of the cell based on the slack of the instance with the smallest slack and the bound on the slack estimate for the pair of ports;
   determine a slack estimate for the pair of ports of the cell by adjusting the bound on the slack estimate for the pair based on the timing credit for the pair; and
   perform static timing analysis of the circuit based on the determined slack estimate.

12. The non-transitory computer readable storage medium of claim 11:
   wherein the pair of ports of the cell comprises a data input port and a clock input port, and wherein the timing context information of each instance includes:
      a data timing window for input data arrival for the data input port, and
      a clock timing window for clock arrival for the clock input port; and
   wherein the instructions for determining a slack for an instance of the cell, when executed by the processor, cause the processor to:
      determine an end of the data timing window for input data arrival of the data input port;
      determine a start of the clock timing window for clock arrival of the clock input port; and
      determine the slack estimate based on the determined start of the clock timing window for clock arrival and the end of the data timing window for input data arrival.

13. The non-transitory computer readable storage medium of claim 12, wherein the instructions for determining a bound on the slack estimate for the port pair, when executed by the processor, cause the processor to:
   determine a merged data timing window for the data input port, the merged data timing window based on the data timing window for the data input port for each of the instances of the cell wherein the merged data timing window for the data input port includes every data timing window for the data input port of each of the instances of the cell, and
   determine a merged clock timing window for the clock input port, the merged clock timing window based on the clock timing window for the clock input port for each of the instance of the cell, wherein the merged clock timing window for the clock input port includes every clock timing window for the clock input port of each of the instances of the cell.

14. The non-transitory computer readable storage medium of claim 11, wherein the pair of ports of the cell comprises a first clock input port and a second clock input port, wherein the timing context information of each instance includes:
   a first clock timing window for clock arrival for the first clock input port, and
   a second clock timing window for clock arrival for the second clock input port; and
   wherein the instructions for determining a slack for an instance of the cell, when executed by the processor, cause the processor to:
      determine an end of the first clock timing window for clock arrival of the first clock input port,
      determine a start of the second clock timing window for clock arrival of the second clock input port, and
      determine the slack based on the determined start of the second clock timing window and the determined end of the first clock timing window.

15. The non-transitory computer of claim 11, wherein the instruction for determining the credit for the cell, when executed by the processor, cause the processor to:
   determine a difference between the slack estimate for the pair of ports for the instance with the smallest slack and the bound on slack estimates for the pair of ports of the cell.

16. A system comprising:
   a processor; and
   a non-transitory computer readable storage medium storing instructions, the instruction when executed by the processor cause the processor to:
      receive digital representation of a circuit, the digital representation of the circuit including a plurality of instances of a cell, the cell having a plurality of ports, the digital representation of the circuit for subsequent design and manufacturing of a circuit;
      receive timing context information for each of the plurality of instances of the cell;
      determine a slack estimate for pair of ports for each of the plurality of instances of the cell;
      identify an instance of the plurality of instances of the cell with a smallest slack estimate;
      determine a bound on the slack estimate for a pair of ports of the cell based on the timing context information for each of the plurality of instances of the cell;
      determine a timing credit for the pair of ports of the cell based on the slack of the instance with the smallest slack and the bound on the slack estimate for the pair of ports;

determine a slack estimate for the pair of ports of the cell by adjusting the bound on the slack estimate for the pair based on the timing credit for the pair; and perform static timing analysis of the circuit based on the determined slack estimate.

17. The system of claim 16:

wherein the pair of ports of the cell comprises a data input port and a clock input port, and wherein the timing context information of each instance includes:

a data timing window for input data arrival for the data input port, and a clock timing window for clock arrival for the clock input port; and wherein the instructions for determining a slack for an instance of the cell, when executed by the processor, cause the processor to:

determine an end of the data timing window for input data arrival of the data input port;

determine a start of the clock timing window for clock arrival of the clock input port; and determine the slack estimate based on the determined start of the clock timing window for clock arrival and the end of the data timing window for input data arrival.

18. The system of claim 17, wherein the instructions for determining a bound on the slack estimate for the port pair, when executed by the processor, cause the processor to:

determine a merged data timing window for the data input port, the merged data timing window based on the data timing window for the data input port for each of the instances of the cell wherein the merged data timing window for the data input port includes every data timing window for the data input port of each of the instances of the cell, and determine a merged clock timing window for the clock input port, the merged clock timing window based on the clock timing window for the clock input port for each of the instance of the cell, wherein the merged clock timing window for the clock input port includes every clock timing window for the clock input port of each of the instances of the cell.

19. The system of claim 16, wherein the pair of ports of the cell comprises a first clock input port and a second clock input port, wherein the timing context information of each instance includes:

a first clock timing window for clock arrival for the first clock input port, and a second clock timing window for clock arrival for the second clock input port; and wherein the instructions for determining a slack for an instance of the cell, when executed by the processor, cause the processor to:

determine an end of the first clock timing window for clock arrival of the first clock input port, determine a start of the second clock timing window for clock arrival of the second clock input port, and determine the slack based on the determined start of the second clock timing window and the determined end of the first clock timing window.

20. The system of claim 16, wherein the instruction for determining the credit for the cell, when executed by the processor, cause the processor to:

determine a difference between the slack estimate for the pair of ports for the instance with the smallest slack and the bound on slack estimates for the pair of ports of the cell.

21. The system of claim 16, wherein the instruction for determining the credit for the cell, when executed by the processor, cause the processor to:

use the credit to perform further design improvements and optimizations.

* * * * *

UNITED STATES PATENT AND TRADEMARK OFFICE
CERTIFICATE OF CORRECTION

PATENT NO.         : 9,754,069 B2
APPLICATION NO.    : 14/885920
DATED              : September 5, 2017
INVENTOR(S)        : Qiuyang Wu and Chang Zhao It is certified that error appears in the above-identified patent and that said Letters Patent is hereby corrected as shown below:

Column 12 Claim 4, Line 42: replace "determine" with -- determining --.

Signed and Sealed this
Twenty-seventh Day of February, 2018

Andrei Iancu
*Director of the United States Patent and Trademark Office*